(12) United States Patent
Shirahata et al.

(10) Patent No.: US 9,318,951 B2
(45) Date of Patent: Apr. 19, 2016

(54) POWER SOURCE CONTROL DEVICE AND METHOD FOR CONTROLLING POWER SOURCE CONTROL DEVICE

(71) Applicant: MITSUBISHI ELECTRIC ENGINEERING COMPANY, LIMITED, Tokyo (JP)

(72) Inventors: Yujiro Shirahata, Tokyo (JP); Hiromori Nomura, Tokyo (JP); Keiji Shibata, Tokyo (JP)

(73) Assignee: MITSUBISHI ELECTRIC ENGINEERING COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/436,814

(22) PCT Filed: Oct. 23, 2012

(86) PCT No.: PCT/JP2012/077320
§ 371 (c)(1),
(2) Date: Apr. 17, 2015

(87) PCT Pub. No.: WO2014/064762
PCT Pub. Date: May 1, 2014

(65) Prior Publication Data
US 2015/0256062 A1    Sep. 10, 2015

(51) Int. Cl.
*H02M 1/36* (2007.01)
*H02M 3/04* (2006.01)
*H02M 3/00* (2006.01)
*G05F 1/577* (2006.01)

(52) U.S. Cl.
CPC . *H02M 3/04* (2013.01); *H02M 3/00* (2013.01)

(58) Field of Classification Search
CPC ... H02J 1/00; G06F 1/266; H02M 2001/0032; H02M 2001/009; H02M 1/36; G05F 1/577

USPC ........ 323/267, 299, 901; 363/49; 307/11, 31, 307/38, 39
See application file for complete search history.

(56) References Cited

U.S. PATENT DOCUMENTS 6,441,590 B1 *  8/2002  Amantea ............. H02M 1/4258
                                                              307/30
7,982,342 B2 *  7/2011  Wang ..................... H02J 3/38
                                                              307/112

(Continued)

FOREIGN PATENT DOCUMENTS

JP    2005137071 A     5/2005
JP    2009247184 A    10/2009

(Continued)

OTHER PUBLICATIONS

International Search Report in corresponding application PCT/JP2012/077320 dated Dec. 18, 2012, 2 page.

*Primary Examiner* — Gary L Laxton
(74) *Attorney, Agent, or Firm* — Rothwell, Figg, Ernst & Manbeck, P.C.

(57) ABSTRACT

A DC-DC converter 4 accumulates power generated by a power source in a power storage element, converts power from an input into a predetermined voltage to supply the predetermined voltage to a load connected to an output, and is activated to start power feeding when an input voltage exceeds Vd1. A power source control section 8 is connected to the output of the converter 4 to obtain power to operate, and controls the power supply to the load while changing an operation mode according to the power source energy. The section 8 is activated by the start of the power supply by the converter to operate in a low power-consumption mode with only the detected power source energy monitor, and starts the power supply to the load when the energy exceeds a level in which the input voltage becomes equal to Vd2 higher than Vd1.

15 Claims, 9 Drawing Sheets

(56) References Cited

U.S. PATENT DOCUMENTS

| | | |
|---|---|---|
| 8,768,554 B2 | 7/2014 | Akimasa |
| 8,868,946 B2 * | 10/2014 | Buhari .................. G06F 1/266 |
| | | 713/320 |
| 2005/0093302 A1 | 5/2005 | Miyazaki et al. |
| 2014/0021920 A1 | 1/2014 | Harada et al. |

FOREIGN PATENT DOCUMENTS

| | | |
|---|---|---|
| JP | 2011091909 A | 5/2011 |
| JP | 2012186958 A | 9/2012 |
| WO | 2012017602 A1 | 2/2012 |
| WO | 2012137343 A1 | 10/2012 |

* cited by examiner (a) VIBRATION ENERGY HARVESTER OUTPUT VOLTAGE (V1)

(b) POWER STORAGE ELEMENT CHARGING VOLTAGE (V3) (DC-DC INPUT VOLTAGE)

(c) DC-DC OUTPUT VOLTAGE (VDC) (POWER SUPPLY VOLTAGE FOR MICROCOMPUTER, SENSORS, AND WIRELESS COMMUNICATION DEVICE)

FIG. 7
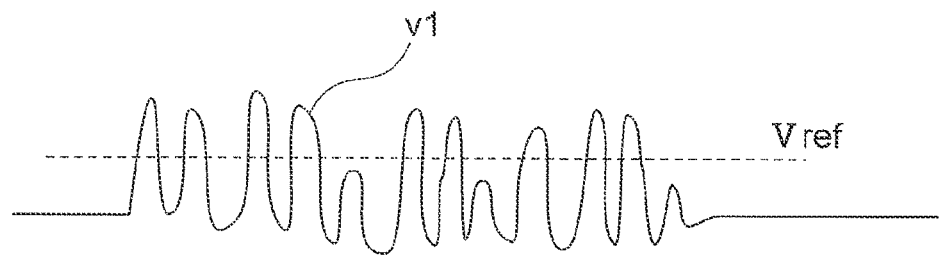
FIG. 8
(a) VIBRATION ENERGY HARVESTER OUTPUT VOLTAGE (V1)
(b) POWER STORAGE ELEMENT CHARGING VOLTAGE (V3) (DC-DC INPUT VOLTAGE)
(c) DC-DC OUTPUT VOLTAGE (VDC) (POWER SUPPLY VOLTAGE FOR MICROCOMPUTER, SENSORS, AND WIRELESS COMMUNICATION DEVICE)
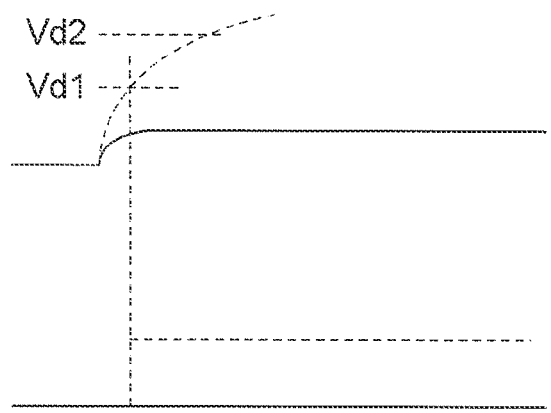

POWER SOURCE CONTROL DEVICE AND METHOD FOR CONTROLLING POWER SOURCE CONTROL DEVICE

CROSS REFERENCE TO RELATED APPLICATIONS

This application is 35 U.S.C. §371 National Phase Entry Application from PCT/JP2012/077320, filed Oct. 23, 2012, and designating the United Sates, which is hereby incorporated by reference in its entirety into this application.

TECHNICAL FIELD

The present invention relates to a power source control device for controlling supply of power from a power source to a load, in particular, a power source control device and the other effective for a power source that generates an extremely small amount of power, such as, for example, a vibration energy harvester.

BACKGROUND ART

For example, there is a related-art vibration energy harvester that has the function of monitoring the amount of generated power with a power source monitoring circuit to determine whether or not to supply power to a peripheral device (see, for example, Patent Literature 1).

CITATION LIST

Patent Literature

[PTL 1] JP 2005-137071 A

SUMMARY OF INVENTION

Technical Problem

In the power source control for the related-art vibration energy harvester, however, devices including the power source monitoring circuit for monitoring the amount of generated power are not all supplied with the power from the vibration energy harvester.

The present invention has been made to solve the problem described above, and has an object to provide a power source control device and the other having a power-source monitoring function, each of which itself receives power supply from the same power source (in particular, a vibration energy harvester that generates an extremely small amount of power) as that for a load to perform a control operation in accordance with the amount of generated power.

Solution to Problem

According to one embodiment of the present invention, there are provided a power source control device and the other configured to accumulate power generated by a power source in a power storage element, the power source control device including: a DC-DC converter for converting power input through an input power feeder into a predetermined voltage to supply the predetermined voltage to a load connected to an output power feeder, the DC-DC converter being configured to be activated to start power feeding when an input-side voltage exceeds a first predetermined voltage, and stop operating when the input-side voltage becomes lower than a second predetermined voltage that is lower than the first predetermined voltage; a power supply switch inserted between the output power feeder and the load, for controlling power supply; a power-source energy detecting section connected to an input side of the DC-DC converter, for detecting a power source energy of the power source; and a power source control section including a microcomputer, which is connected to the output power feeder so as to be supplied with power to operate, for controlling the power supply to the load while changing an operation mode in accordance with the power source energy of the power source, in which the power source control section is activated by the start of the power supply by the DC-DC converter to operate in a low power-consumption operation mode in which only the power source energy detected by the power-source energy detecting section is periodically monitored, and closes the power supply switch to start the power supply to the load when the power source energy exceeds a first level corresponding to a state in which the voltage of the input power feeder becomes equal to a third predetermined voltage higher than the first predetermined voltage.

Advantageous Effects of Invention

According to one embodiment of the present invention, the power source control device and the other having the power-source monitoring function can be provided, each of which itself receives power supply from the same power source (in particular, a vibration energy harvester that generates an extremely small amount of power) as that for a load to perform the control operation in accordance with the amount of generated power.

BRIEF DESCRIPTION OF DRAWINGS

FIG. 7 is a graph showing an operation of a comparison circuit illustrated in FIG. 6.

FIG. 8 is a time chart of outputs from sections of a power source control device, for illustrating a problem to be solved in a fourth embodiment of the present invention.

DESCRIPTION OF EMBODIMENTS

Figure 1:
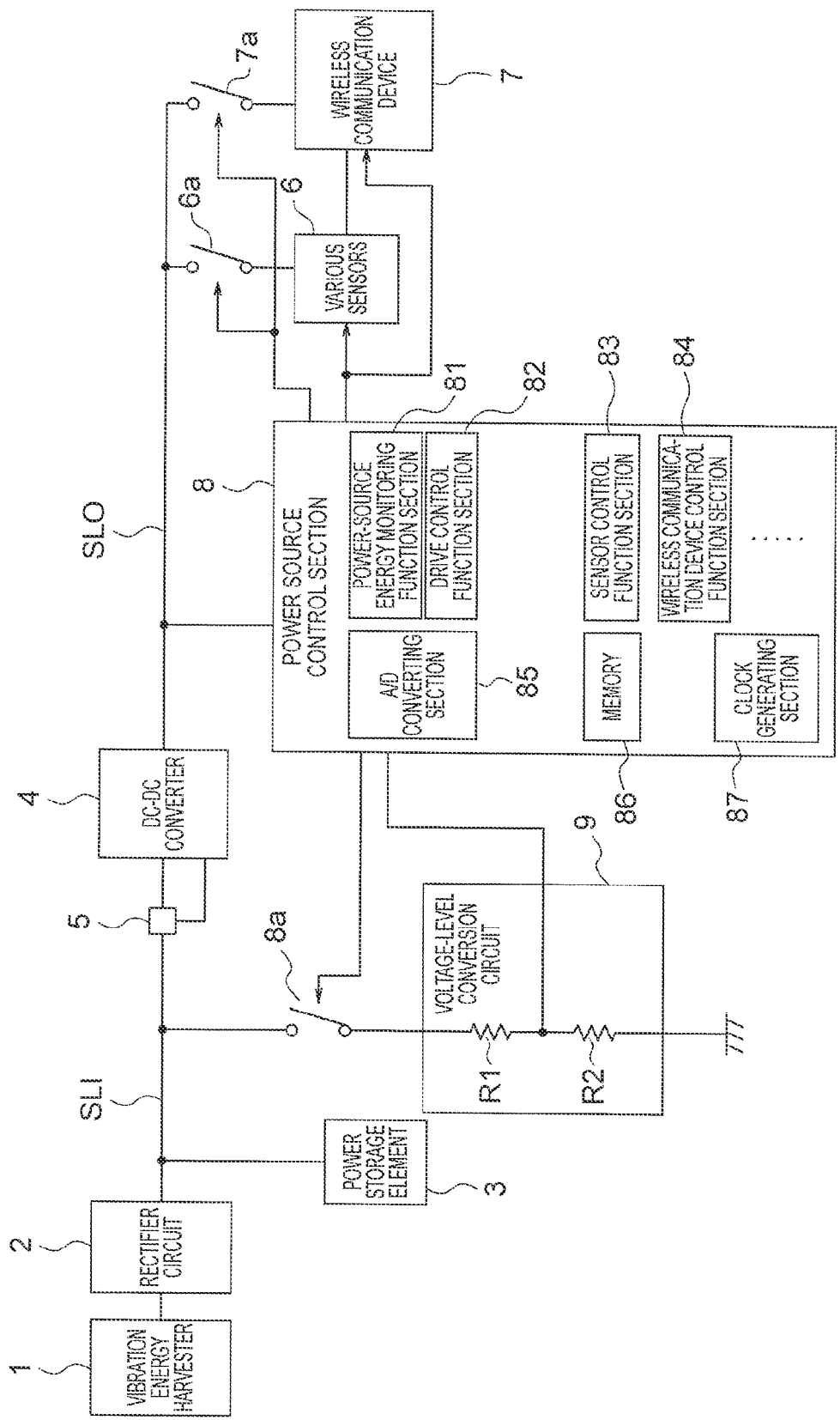
FIG. 1 is a diagram illustrating a configuration of a power source control device according to a first embodiment of the present invention.

Now, a power source control device according to the present invention is described in accordance with each of embodiments referring to the drawings. In the embodiments, the same or corresponding parts are denoted by the same reference symbols, and the overlapping description is herein omitted.

Moreover, although the power source control device provided with a vibration energy harvester that generates an extremely small amount of power as a power source is described below, the type of power source is not limited thereto.

First Embodiment

FIG. 1 is a diagram illustrating a configuration of a power source control device according to a first embodiment of the present invention. In FIG. 1, between a vibration energy harvester 1, which is a power source, and a DC-DC converter 4, a rectifier circuit 2 for rectifying a current generated by the vibration energy harvester 1, a power storage element 3 for storing the current rectified by the rectifier circuit 2, such as a capacitor, and a voltage detector 5 for detecting an input-side voltage of the DC-DC converter 4 are connected in the stated order along an input power feeder SL1.

Further, between the input power feeder SL1, which is located between the power storage element 3 and the voltage detector 5, and a ground, a voltage-level conversion circuit 9 is connected through a voltage detection switch 8a that is controlled to be opened and closed by a power source control section 8. The voltage-level conversion circuit 9, which is a power-source energy detecting section, converts a voltage level by, for example, voltage-dividing resistors R1 and R2, so that a charging voltage of the power storage element 3, which indicates a power source energy of (amount of power generated by) the vibration energy harvester 1, is monitored by the power source control section 8. A signal obtained by the conversion is input to the power source control section 8. After being subjected to A/D conversion by an A/D converting section 85, the signal is processed. The voltage detection switch 8a may be included in the voltage-level conversion circuit 9.

The power source control section 8 and loads that include, for example, various sensors 6 and a wireless communication device 7 are connected to an output side of the DC-DC converter 4 along an output power feeder SLO. The various sensors 6 and the wireless communication device 7 are connected to the power feeder SLO respectively through power-supply switches 6a and 7a that are controlled to be opened and closed by the power source control section 8. For example, the wireless communication device 7 transmits data detected by the sensors 6 to a device at a predetermined data collection location.

The DC-DC converter 4 starts and stops an operation in accordance with the voltage detected by the voltage detector 5 and supplies the power stored in the power storage device 3 after converting a voltage thereof into a desired voltage that can be used by the various sensors 6, the wireless communication device 7, and the power source control section 8. The voltage detected by the voltage detector 5 becomes basically the same as the charging voltage of the power storage element 3.

The power source control section 8 is a microcomputer (hereinafter also referred to as "microcomputer 8") and is illustrated as a functional block.

A power-source energy monitoring function section 81 opens and closes the switch 8a to detect and monitor the charging voltage (indicating the power source energy) of the power storage element 3 based on the signal output from the voltage-level conversion circuit 9 in predetermined periods.

A drive control function section 82 switches a driving state (switches an operation mode) of the power source control section 8 and opens and closes the switches 6a and 7a to control the start and stop of the operations of the various sensors 6 and the wireless communication device 7 in accordance with whether or not the power is fed from the DC-DC converter 4 and with the charging voltage of the power storage element 3 obtained by the power-source energy monitoring function section 81.

As the driving state of the power source control section 8, the power source control section 8 has a plurality of operation modes with different power consumptions (a plurality of operation modes with different power consumptions, including a full-operation mode in which a maximum function is fulfilled with the largest power consumption and a low power-consumption operation mode in which the power consumption is the lowest). Depending on the result of detection of the charging voltage of the power storage element 3, the operation mode is switched. The power consumption is changed by switching at least one of a period of detection of the charging voltage of the power storage element 3, selection of a range of the function sections to be started in the power control section 8, and a frequency of an operation clock generated by a clock generating section 87 described below.

A sensor control function section 83 controls the operation of the started various sensors 6, whereas a wireless communication device control function section 84 controls the operation of the started wireless communication device 7.

A memory 86 stores necessary data. The clock generating section 87 generates the operation clock at the frequency in accordance with the plurality of operation modes of the power source control section 8.

Figure 2:
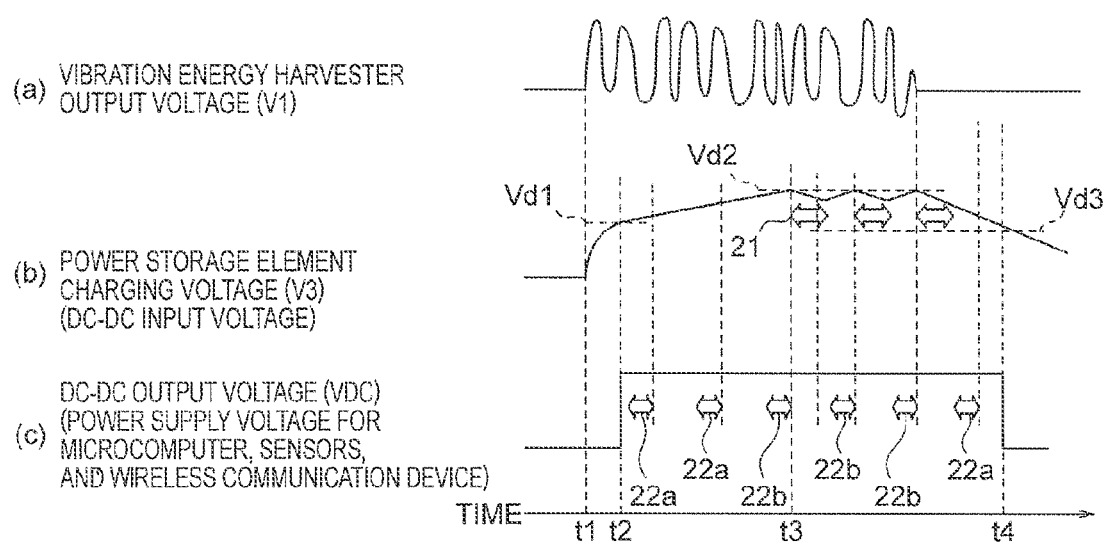
FIG. 2 is a time chart of outputs from sections of the power source control device illustrated in FIG. 1.

FIG. 2 is a time chart of outputs from the respective sections of the power source control device illustrated in FIG. 1. Part (a) represents an output voltage (V1) of the vibration energy harvester 1, part (b) represents the charging voltage (V3) of the power storage element 3 (input voltage of the DC-DC converter 4), and part (c) represents an output voltage (VDC) of the DC-DC converter 4 (power supply voltage for the microcomputer 8, the sensors 6, and the wireless communication device 7). Moreover, the reference symbol 21 denotes an operating period (including an initializing operation and the like) of the sensors 6 and the wireless communication device 7, and the reference symbols 22a and 22b denote power-source energy monitoring operation (voltage monitoring) periods.

Figure 3:
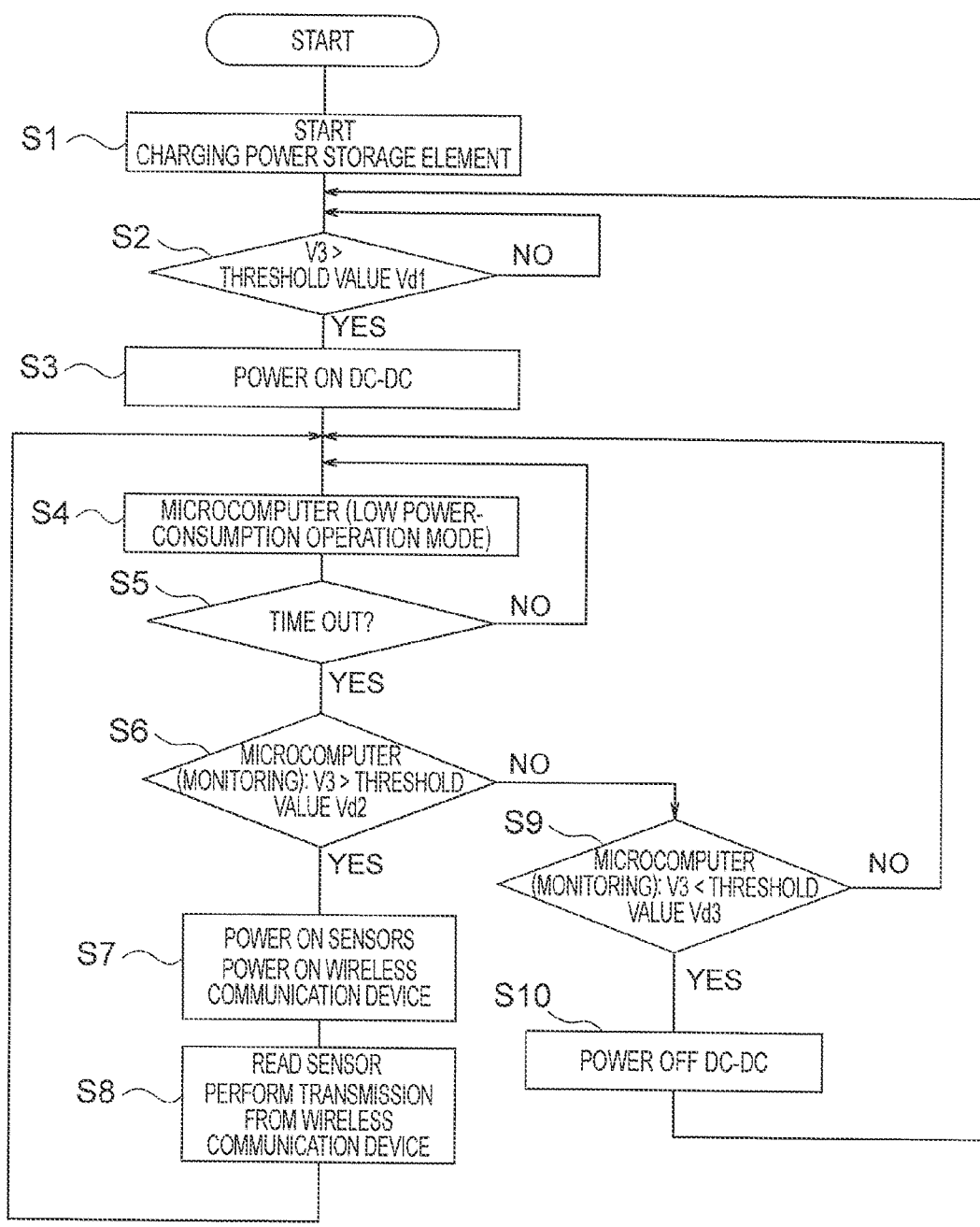
FIG. 3 is an operation flowchart of the power source control device illustrated in FIG. 1.

FIG. 3 is an operation flowchart of the power source control device illustrated in FIG. 1.

Next, the operation is described referring to FIGS. 1 to 3.

When the vibration energy harvester 1 starts generating power at a time t1 of FIG. 2, the charging of the power storage element 3 is started to gradually increase the charging voltage V3 of the power storage element 3 as shown in part (b) of FIG. 2 (Step 51). In this state, the DC-DC converter 4, the microcomputer 8, the sensors 6, and the wireless communication device 7 are in an operation stop state. In addition, the microcomputer 8, the sensors 6, and the wireless communication device 7 are not supplied with power.

At a time t2 at which the voltage detected by the voltage detector 5 exceeds a first threshold value Vd1 (Step S2), the DC-DC converter 4 starts (Step S3) to supply power only to the microcomputer 8. In this state, the switches 6a and 7a are in an open state. Thus, the sensors 6 and the wireless communication device 7 are not supplied with the power and therefore are not started.

When the power feeding from the DC-DC converter 4 is started, the drive control function section 82 of the microcomputer 8 drives the power-source energy monitoring function section 81, the A/D converting section 85, and the clock generating section 87 in predetermined periods to monitor the power source energy. The sensor control function section 83, the wireless communication device control function section 84, and other function sections whose illustration is omitted are not started. The drive control function section 82 keeps the switches 6a and 7a in the open state so as to maintain the sensors 6 and the wireless communication device 7 in a no power-supply state.

The power-source energy monitoring function 81 performs a periodic power-source energy monitoring operation as indicated by the reference symbols 22a and 22b in part (c) of FIG. 2. This operation is performed by controlling the switch 8a to periodically perform an opening/closing operation and monitoring the output of the voltage-level conversion circuit 9 at this time. The drive control function section 82 controls the clock generating section 87 so as to generate, for example, a clock at the lowest frequency. When the power-source energy monitoring function section 81 has a plurality of power-source energy monitoring operation periods, the control is performed so that the monitoring operation having the longest period is performed (Steps S4 and S5). As a result, the charging voltage V3 of the power storage element 3 increases instead of dropping.

In the manner described above, the low power-consumption operation mode function of the microcomputer 8 is used in combination with a power-saving operation in which the loads such as the sensors 6 and the wireless communication device 7 are not operated. As a result, for example, by preventing the voltage detected by the voltage detector 5 from becoming lower than a predetermined threshold value (for example, a third threshold value Vd3 described later: Vd1>Vd3) due to the drop of the charging voltage and hence preventing the operation of the DC-DC converter 4 from stopping so as not to reset the microcomputer 8 due to the stop of power supply to the microcomputer 8, the operation can be continued. A loop composed of Steps S4 to S6 and S9 illustrated in FIG. 3 corresponds to the periodic power-source energy monitoring operation.

The power-source energy monitoring function section 81 monitors the signal indicating the charging voltage V3 of the power storage element 3, which is output from the voltage-level conversion circuit 9, in predetermined periods. At a time t3 at which the charging voltage V3 of the power storage element 3 exceeds a second threshold value Vd2 (Vd1<Vd2) that is larger than the first threshold value Vd1 (Step S6), the drive control function section 82 determines that the amount of accumulated charges in the power storage element 3 is sufficient to start the loads such as the sensors 6 and the wireless communication device 7 and therefore closes the switches 6a and 7a to feed power through the output power feeder SLO to the sensors 6 and the wireless communication device 7 to start the sensors 6 and the wireless communication device 7 (Step S7).

Then, the drive control function section 82 starts the sensor control function section 83 and the wireless communication device control function section 84 so that, for example, the sensor control function section 83 controls the sensors 6 to read the detection values and the wireless communication device control function section 84 controls the wireless communication device 7 to transmit the data read by the sensors 6 (Step S8). Thereafter, while the periodic monitoring operation is being performed by the power-source energy monitoring function section 81 as indicated by the reference symbols 22a and 22b in part (c) of FIG. 2, the start of the sensors 6 and the wireless communication device 7 is continuously carried out as indicated by the reference symbol 21 in part (b) of FIG. 2. The charging voltage V3 is temporarily lowered due to the power consumption in a state in which the microcomputer 8, the sensors 6, and the wireless communication device 7 are being driven.

Among the power-source energy monitoring operation periods shown in part (c) of FIG. 2, the case where the result of monitoring is: charging voltage V3≤threshold value Vd2 is indicated by the reference symbol 22a and the case where the result of monitoring is: charging voltage V3>threshold value Vd2 is indicated by the reference symbol 22b. Moreover, the determination for the charging voltage V3 is made at the end of each of the power-source energy monitoring operation periods 22a and 22b.

Then, when the charging voltage V3 becomes lower than the third threshold value Vd3 (Vd1>Vd3) that is smaller than the first threshold value Vd1, for example, at a time t4 (Step S9), the operation of the DC-DC converter 4 is stopped (Step S10). Therefore, the power supply to the microcomputer 8 and also to the loads including the sensors 6 and the wireless communication device 7 is stopped to bring the microcomputer 8 and the loads into the operation stop state.

A threshold value Vd3a (larger than the third threshold value Vd3 and smaller than the first threshold value Vd1: Vd3<Vd3a<Vd1) for the charging voltage V3, at which the microcomputer 8 stops the operation by itself, may be set so that the microcomputer 8 stops the operation by itself before the power feeding from the DC-DC converter 4 is stopped.

With the configuration described above, even in the case where the amount of energy accumulated in the power storage element is small at the start of the power source or the like, the power source control section 8 that is the microcomputer using the same power source as that for the loads waits in the low power-consumption operation state so that only the minimum necessary power source energy monitoring operation is intermittently performed. In this manner, a transition to an operation failure state is avoided. After the retention of the power allowing the operation is detected, the operation is performed. In this manner, wasteful energy consumption is reduced to enable the circuit operation to be continued.

Figure 4:
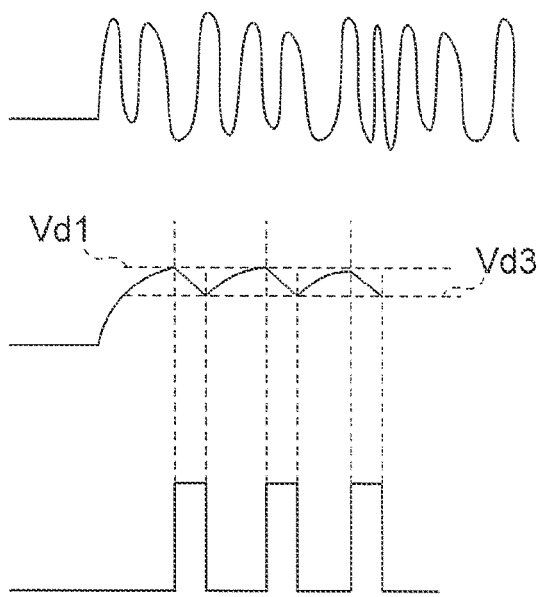
FIG. 4 is a time chart of outputs from sections of a power source control device without functions according to the present invention.

FIG. 4 is a time chart of outputs from the respective sections of a power source control device corresponding to FIG. 2 when the microcomputer 8 illustrated in FIG. 1 is a power source control device without functions of operating in the low power-consumption operation mode and performing the power-source energy monitoring operation to operate the microcomputer 8 and the loads (6 and 7) after the detection of the retention of power allowing the operation. In this case, when the input-side voltage becomes equal to Vd1, the DC-DC converter 4 immediately starts and supplies power to the microcomputer 8 and the loads (6 and 7). Therefore, an operation in which the charging voltage V3 of the power storage element 3 immediately becomes lower than Vd3 to bring the DC-DC converter 4 into the operation stop state is repeated. As a result, the power supply becomes intermittent and the circuit operation cannot be continued.

Second Embodiment

Figure 5:
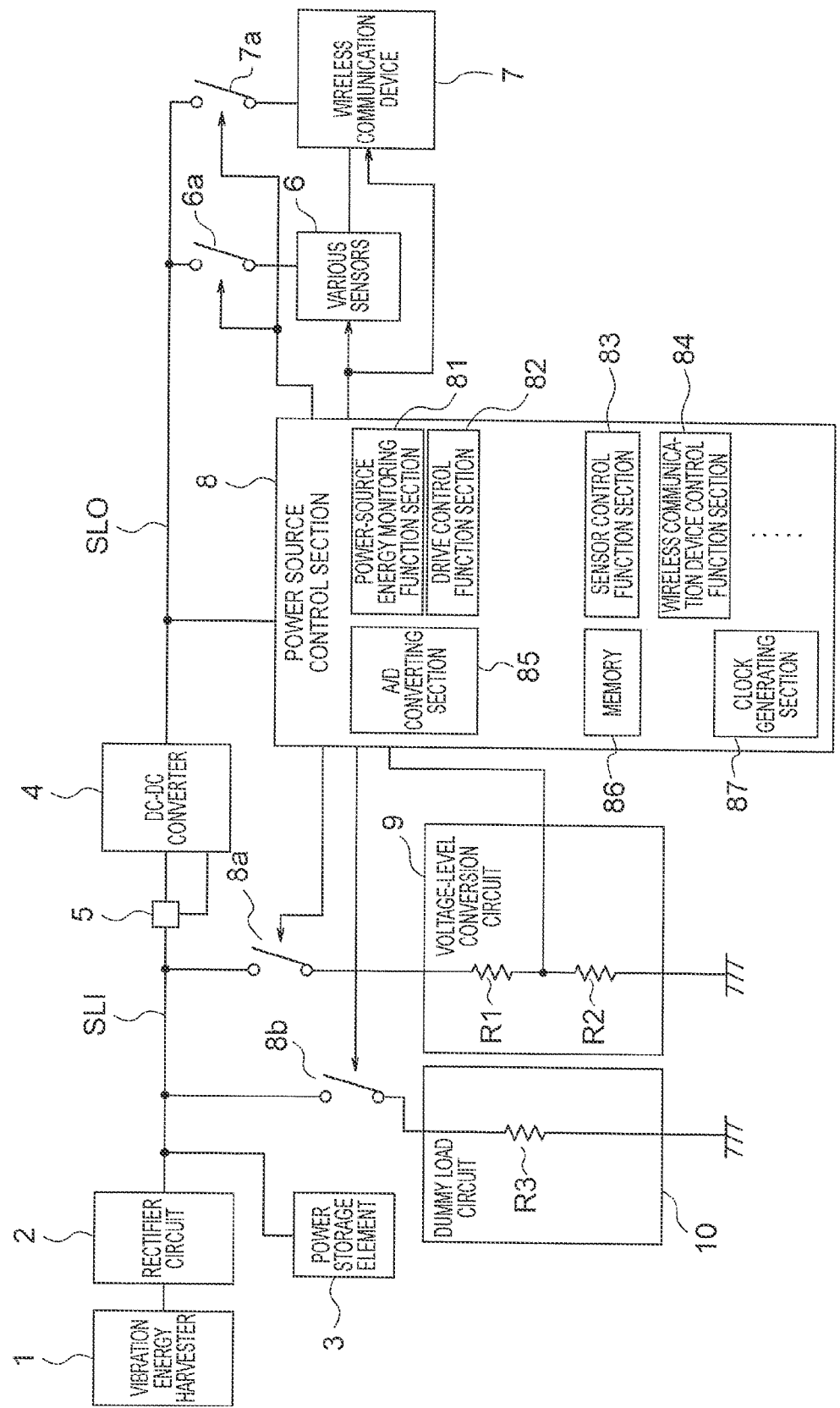
FIG. 5 is a diagram illustrating a configuration of a power source control device according to a second embodiment of the present invention.

FIG. 5 is a diagram illustrating a configuration of a power source control device according to a second embodiment of the present invention. The power source control device according to this embodiment detects a voltage drop occurring when a dummy load is connected to the input power feeder SLI at the time of the periodic power-source energy monitoring operation in place of the voltage of the input power feeder SLI.

A difference from the power source control device according to the first embodiment illustrated in FIG. 1 lies in that the power-source energy detection section includes the voltage-level conversion circuit 9 connected to the input power feeder SLI to detect the voltage and a dummy load circuit 10 for allowing a dummy load R3 to be connected to the input power feeder SL1 to control a micro current to flow to a ground side. The voltage detection switch 8a, which is controlled to be opened and closed by the power source control section 8, is connected in series to the voltage-level conversion circuit 9. The series circuit is connected between the input power feeder SLI and the ground. Further, a voltage-drop measurement switch 8b, which is controlled to be opened and closed by the power source control section 8, is connected in series to the dummy load circuit 10. The series circuit is connected between the input power feeder SLI and the ground. The voltage detection switch 8a and the voltage-drop measurement switch 8b may be respectively included in the voltage-level conversion circuit 9 and the dummy load circuit 10.

In this embodiment, the power-source energy monitoring function section 81 of the power source control section 8 controls the switches 8a and 8b to be opened and closed at the time of the periodic power-source energy monitoring operation so as to detect a voltage drop of the voltage of the input power feeder SLI occurring when the dummy load R3 is connected to the input power feeder SLI relative to the voltage of the input power feeder SLI when the dummy load R3 is not connected to the input power feeder SLI. A value (level) of the voltage drop when the dummy load R3 is connected, which corresponds to a state where the charging voltage becomes equal to each of the above-mentioned threshold values Vd1, Vd2, Vd3, and Vd3a for the input power feeder SLI, is previously obtained and stored (at least the value of the voltage drop corresponding to the threshold value Vd2 is stored) in the memory 86.

The drive control function section 82 of the power source control section 8 compares the detected voltage drop with the voltage drop corresponding to each of the threshold values stored in the memory 86 to control the drive of the power source device in a similar manner to that of the embodiment described above based on the relationship between the detected voltage drop and each of the threshold values. Specifically, when the voltage drop becomes smaller than the voltage drop corresponding to the second threshold value Vd2, the switches 6a and 7a are closed to feed power through the output power feeder SLO to the loads such as the sensors 6 and the wireless communication device 7 to activate the loads. In this case, the voltage drop becomes smaller as the voltage of the input power feeder SLI becomes higher.

In this embodiment, a capacitor having a large electric capacitance and a high internal impedance such as an electric double layer capacitor, which is more likely to exhibit a voltage-drop characteristic, is preferred as the power storage element 3 to be used.

The remaining operation is basically the same as that of the embodiment described above.

Third Embodiment

Figure 6:
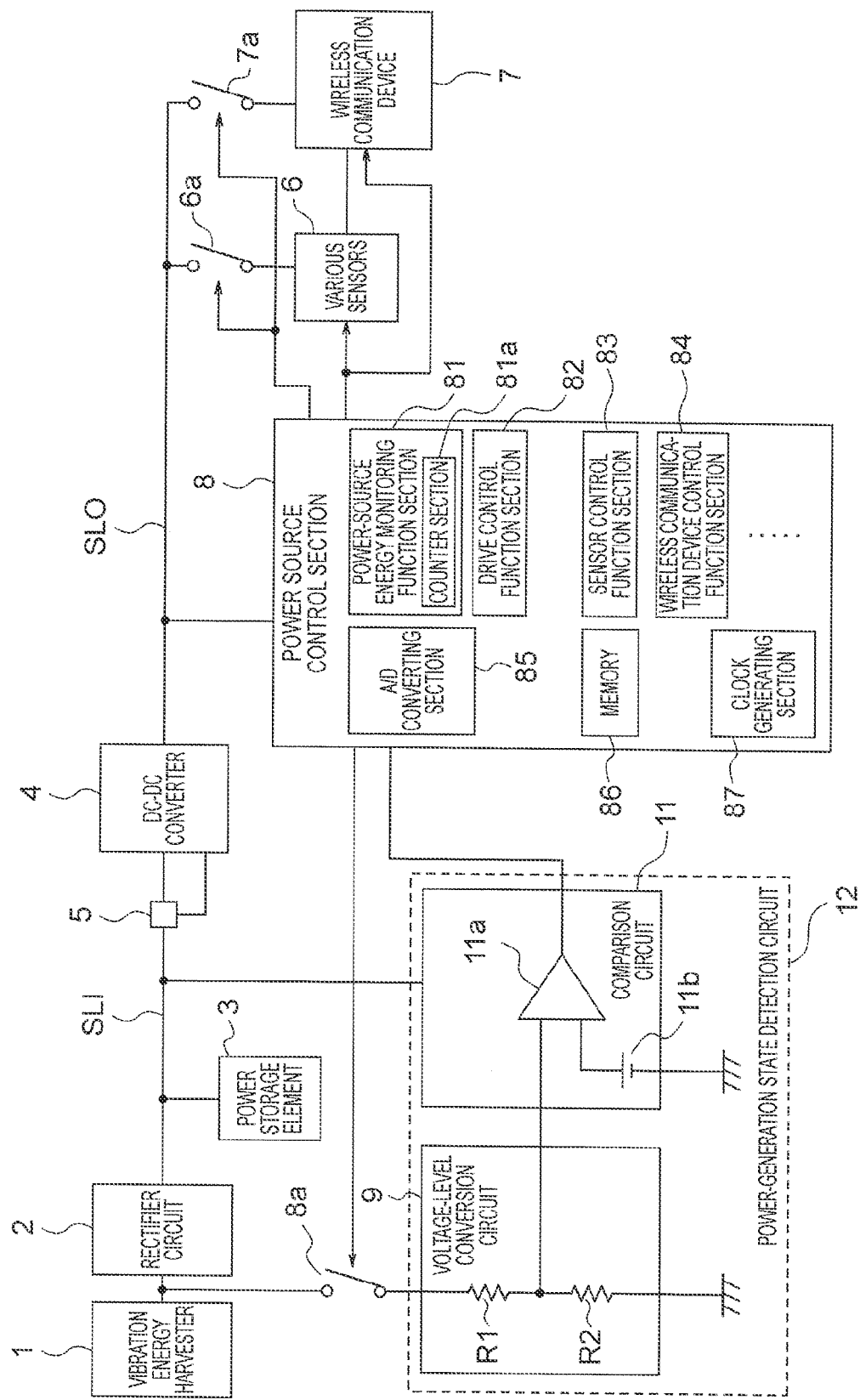
FIG. 6 is a diagram illustrating a configuration of a power source control device according to a third embodiment of the present invention.

FIG. 6 is a diagram illustrating a configuration of a power source control device according to a third embodiment of the present invention. This embodiment is limited to the case where a power source is the vibration energy harvester 1 or the like whose voltage of the generated power pulsates as shown in part (a) of FIG. 2. The power source control device of this embodiment obtains a count value obtained by counting pulses for a predetermined time period, which are obtained by pulsing the generated voltage of the power source through comparison with a predetermined reference voltage in place of the voltage of the input power feeder SLI at the time of a periodic power-source energy monitoring operation.

A difference from the power source control device according to the first embodiment illustrated in FIG. 1 lies in that the power-source energy detecting section is a power-generation state detection circuit 12 connected to the output side of the vibration energy harvester 1 to pulse the generated voltage through the comparison with the predetermined reference voltage. The power-generation state detection circuit 12 includes the voltage-level conversion circuit 9 and a comparison circuit 11. The voltage-level conversion circuit 9 detects the output voltage of the vibration energy harvester 1 after converting the level thereof. As shown in FIG. 7, the comparison circuit 11 compares an output v1 from the voltage-level conversion circuit 9, which indicates the output voltage of the vibration energy harvester 1, with a predetermined reference voltage Vref and generates a pulse indicating a state in which v1 is larger than Vref (v1>Vref). In this manner, a signal having a small amplitude, which contributes less to the charging of the power storage element 3, is neglected. As a result, the power source energy by the vibration energy harvester 1 can be more precisely obtained.

The voltage detection switch 8a, which is controlled to be opened and closed by the power source control section 8, is connected in series to the voltage-level conversion circuit 9. The series circuit is connected between the input power feeder SLI and the ground. The voltage detection switch 8a may be included in the voltage-level conversion circuit 9. The comparison circuit 11 includes a comparator 11a having one input connected to the output v1 from the voltage-level conversion circuit 9, another input connected to a reference power source 11b that generates the reference voltage Vref, and an output connected to the power source control section 8.

In this embodiment, the power-source energy monitoring function section 81 of the power source control section 8 controls the switch 8a to be opened and closed to detect the count value obtained by counting the pulses generated by the power-generation state detection circuit 12 for the predetermined time period at the time of the periodic power-source energy monitoring operation. Therefore, the power-source energy monitoring circuit 81 includes a counter section 81a. The count value (level) corresponding to the state where the charging voltage becomes equal to each of the above-mentioned threshold values Vd1, Vd2, Vd3, and Vd3a regarding the input power feeder SLI is obtained in advance and stored (at least the count value corresponding to the threshold value Vd2 is stored) in the memory 86.

The drive control function section 82 of the power source control section 8 compares the detected count value with the count value corresponding to each of the threshold values stored in the memory 86 to control the drive of the power source device in a similar manner to that of the embodiments described above based on the relationship between the detected count value and each of the threshold values. Specifically, when the count value exceeds the count value corresponding to the second threshold value Vd2, the switches 6a and 7a are closed to feed power to the loads such as the sensors 6 and the wireless communication device 7 through the output power feeder SLO to activate the loads.

The remaining operation is basically the same as that of the embodiments described above.

Fourth Embodiment

In the case where the vibration energy harvester can only supply a micro output in a continuous manner and therefore the output voltage does not increase, the power storage capacitance does not increase when the power storage element includes the capacitor or the like alone. Therefore, in some cases, the DC-DC converter 4 cannot be activated and the loads cannot be operated. FIG. 8 is a time chart of outputs from the respective sections of a power source control device in the above-mentioned case. Part (a) represents the output voltage (V1) of the vibration energy harvester 1, part (b) represents the charging voltage (V3) of the power storage element 3 (input voltage of the DC-DC converter 4), and part (c) represents the output voltage (VDC) of the DC-DC converter 4 (power supply voltage for the microcomputer 8, the sensors 6, and the wireless communication device 7). Although the vibration energy harvester 1 is generating power, the charging voltage (V3) of the power storage element 3 increases but does not exceed the first threshold value Vd1 and the DC-DC converter 4 still remains deactivated.

Figure 9:
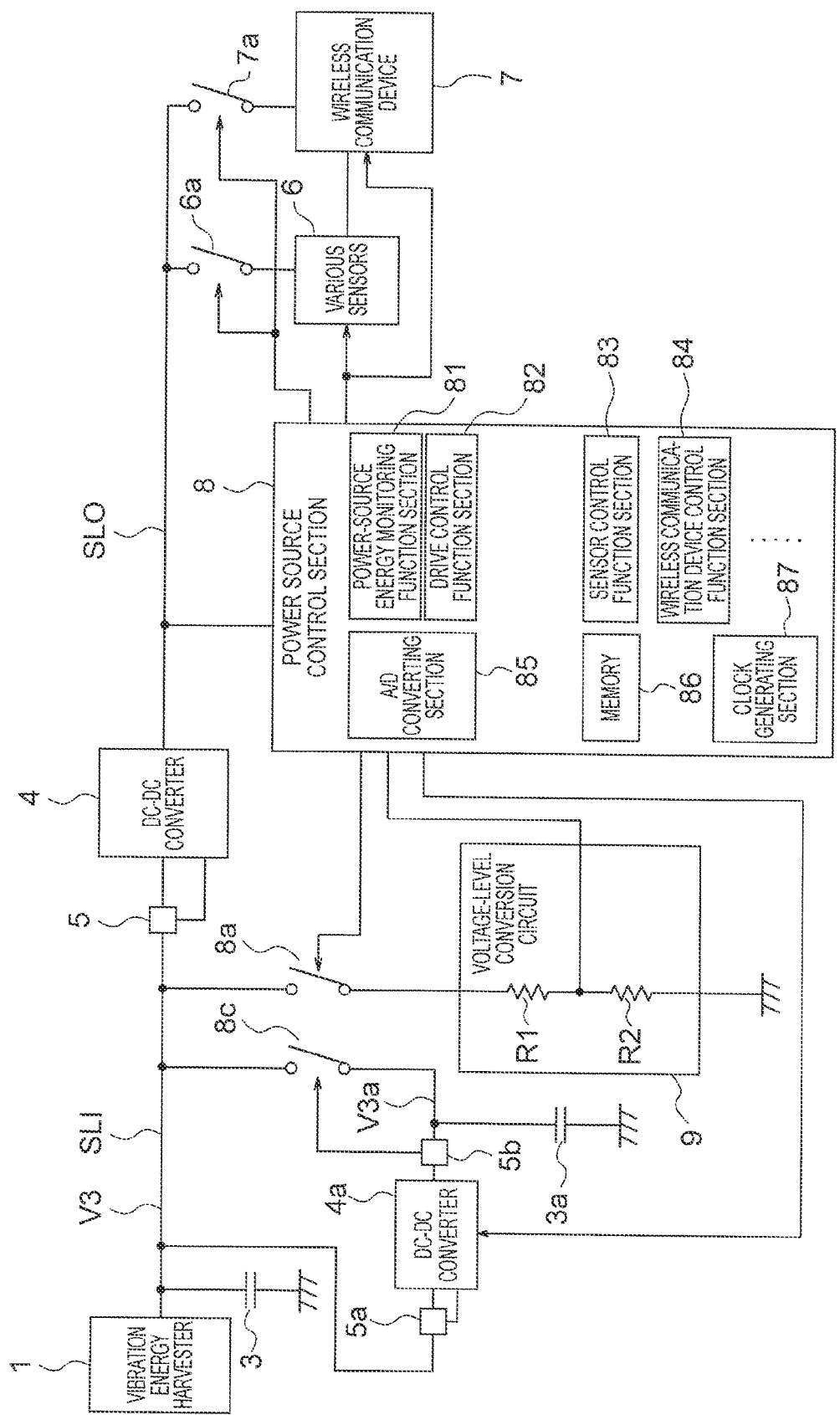
FIG. 9 is a diagram illustrating a configuration of a power source control device according to the fourth embodiment of the present invention.

This embodiment is for solving the problem described above. FIG. 9 is a diagram illustrating a configuration of a power source control device according to a fourth embodiment of the present invention. A circuit including a boosting DC-DC converter 4a having a starting voltage lower than that of the DC-DC converter 4 and a boosting power storage element 3a that accumulates power by the boosting DC-DC converter 4a is connected in parallel to the input power feeder SLI on the output side of the power storage element 3 to form a loop. The power source control section 8 drives the boosting DC-DC converter 4a when no power is fed from the DC-DC converter 4 for a predetermined period of time.

More specifically, the circuit, which is connected in parallel to the input power feeder SLI on the output side of the power storage element 3, includes the boosting DC-DC converter 4a, a voltage detector 5a connected to an input side of the boosting DC-DC converter 4a to output a detected voltage to the boosting DC-DC converter 4a, the boosting power storage element 3a connected to an output side of the boosting DC-DC converter 4a, and a voltage detector 5b for detecting a charging voltage of the boosting power storage element 3a to generate a signal for controlling a boosting switch 8c connected between the boosting power storage element 3a and the input power feeder SLI to be opened and closed.

Figure 10:
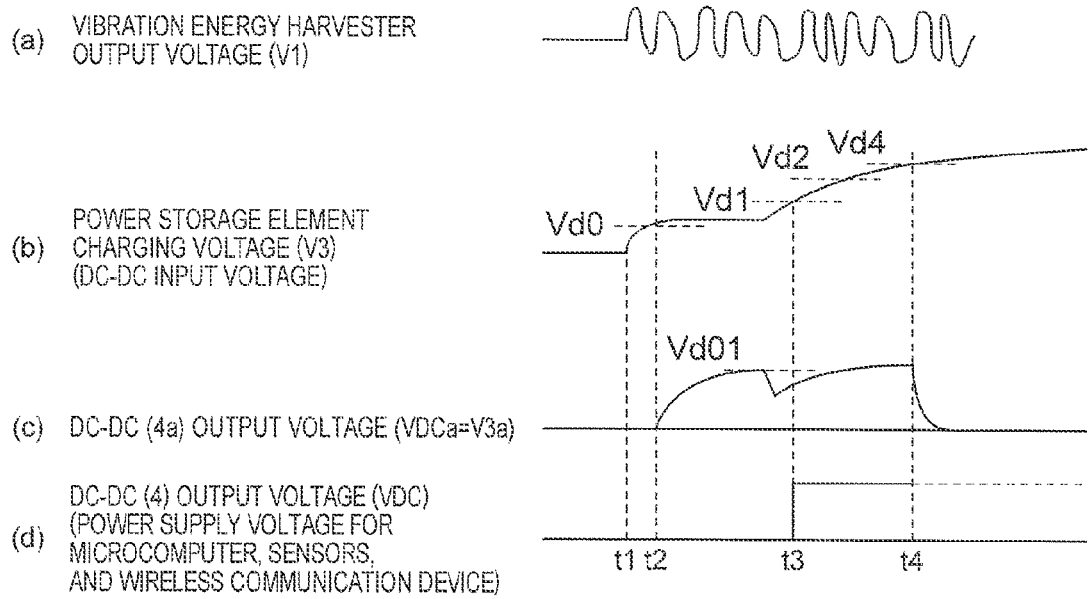
FIG. 10 is a time chart of outputs from sections of the power source control device illustrated in FIG. 9.

FIG. 10 is a time chart of outputs from the respective sections of the power source control device illustrated in FIG. 9. Part (a) represents the output voltage (V1) of the vibration energy harvester 1, part(b) represents the charging voltage (V3) of the power storage element 3 (input voltage of the DC-DC converter 4), part (c) represents an output voltage of the boosting DC-DC converter 4a (VDCa=V3a), and part (d) represents the output voltage (VDC) of the DC-DC converter 4 (power supply voltage for the microcomputer 8, the sensors 6, and the wireless communication device 7).

Next, an operation is described referring to FIGS. 9 and 10.

When the vibration energy harvester 1 starts generating power at the time t1, the power storage element 3 is started. The voltage detector 5a detects the voltage on the input side of the boosting DC-DC converter 4a. At the time t2, the charging voltage V3 of the power storage element 3 becomes, for example, V3>0.4 V (Vd0). Then, the boosting DC-DC converter 4a starts operating to start charging the boosting power storage element 3a.

The vibration energy harvester 1 cannot increase the output voltage. Therefore, the boosting DC-DC converter 4a serves to increase the voltage.

Then, at the time t3, the charging voltage V3a of the boosting power storage element 3a on the output side of the boosting DC-DC converter 4a increases to become, for example, V3a>3.0 V (=Vd01), the voltage detector 5b detects that V3a exceeds Vd01 and transmits a signal to close the boosting switch 8c. As a result, the power storage element 3 is charged with the charging voltage V3a of the boosting power storage element 3a.

Then, when the charging voltage V3 of the power storage element 3 increases to become V3>1.0 V (=Vd1), the DC-DC converter 4 is activated similarly to each of the embodiments described above and the operations in the low power-consumption operation mode in which only the power source energy monitoring is periodically performed is started.

Specifically, by auxiliary charging by the boosting DC-DC converter 4a, the charging voltage V3 increases. When the charging voltage V3 exceeds the first threshold value Vd1, the DC-DC converter 4 is activated and the microcomputer 8 starts operating in the low power-consumption operation mode.

Then, the microcomputer 8 monitors the charging voltage V3 of the power storage element 3. When V3>1.5 V (=Vd2), the power supply to the loads such as the sensors 6 and the wireless communication device 7 is started.

The microcomputer 8 monitors the voltage of the charging voltage V3. When the charging voltage V3 exceeds the second threshold value Vd2, the power supply to the loads is started.

Further, when the charging voltage V3 further increases to become: V3>3.0 V (=Vd4), the microcomputer 8 stops the operation of the boosting DC-DC converter 4a. A fourth threshold value Vd4 (fourth predetermined voltage) is larger than the second threshold value Vd2 (Vd3<Vd1<Vd2<Vd4).

The microcomputer 8 monitors the charging voltage V3 and stops auxiliary charging by the boosting DC-DC converter 4a at the time t4 at which the charging voltage V3 reaches the output voltage of the boosting DC-DC converter 4a so as to stop the power consumption by the boosting DC-DC converter 4a.

Similarly to each of the embodiments described above, among the above-mentioned operations of the microcomputer 8, the monitoring of the power source energy is performed by the power-source energy monitoring function section 81, whereas the control of drive of each of the sections is performed by the drive control function section 82.

By performing the auxiliary charging operation by the boosting DC-DC converter 4a, an energy loss in the case where the vibration energy harvester 1 can only supply the micro output in a continuous manner is reduced.

The above-mentioned voltage values are all guide values. As the boosting DC-DC converter 4a, the one that is driven at a low voltage with low current consumption (for example, a charge pump or a switching power source) is used.

The present invention is not limited to each of the embodiments described above and encompasses all the possible combinations thereof.

INDUSTRIAL APPLICABILITY

The power source control device and the method for controlling a power source control device according to the present invention are applicable to power sources in various fields and of various types of machines.

REFERENCE SIGNS LIST 1 vibration energy harvester, 2 rectifier circuit, 3 power storage element, 3a boosting power storage element, 4 DC-DC converter, 4a boosting DC-DC converter, 5, 5a, 5b voltage detector, 6a, 7a power-supply switch, 6 various sensors, 7 wireless communication device, 8 power source control section (microcomputer), 8a voltage detection switch, 8b voltage-drop measurement switch, 8c boosting switch, 9 voltage-level conversion circuit, 10 dummy load circuit, 11 comparison circuit, 11a comparator, 11b reference power source, 12 power-generation state detection circuit, 81 power-source energy monitoring circuit, 81a counter section, 82 drive control function section, 83 sensor control function section, 84 wireless communication device control function section, 85 A/D converting section, 86 memory, 87 clock generating section, R1, R2 voltage-dividing resistor, R3 dummy load, SLI input power feeder, SLO output power feeder.

The invention claimed is:

1. A power source control device configured to accumulate power generated by a power source in a power storage element, the power source control device comprising:
   a DC-DC converter for converting power input through an input power feeder into a predetermined voltage to supply the predetermined voltage to a load connected to an output power feeder, the DC-DC converter being configured to be activated to start power feeding when an input-side voltage exceeds a first predetermined voltage, and stop operating when the input-side voltage becomes lower than a second predetermined voltage that is lower than the first predetermined voltage;
   a power supply switch inserted between the output power feeder and the load, for controlling power supply;
   a power-source energy detecting section connected to an input side of the DC-DC converter, for detecting a power source energy of the power source; and
   a power source control section comprising a microcomputer, which is connected to the output power feeder so as to be supplied with power to operate, for controlling the power supply to the load while changing an operation mode in accordance with the power source energy of the power source,
   wherein the power source control section is activated by the start of the power supply by the DC-DC converter to operate in a low power-consumption operation mode in which only the power source energy detected by the power-source energy detecting section is periodically monitored, and closes the power supply switch to start the power supply to the load when the power source energy exceeds a first level corresponding to a state in which the voltage of the input power feeder becomes equal to a third predetermined voltage higher than the first predetermined voltage.

2. The power source control device according to claim 1, wherein:
   the power-source energy detecting section comprises a voltage-level conversion circuit connected to the input power feeder to detect the voltage of the input power feeder as the power source energy; and
   the power source control section closes the power supply switch to start the power supply to the load when the voltage of the input power feeder exceeds the third predetermined voltage higher than the first predetermined voltage.

3. The power source control device according to claim 1, wherein:
   the power-source energy detecting section comprises a voltage-level conversion circuit connected to the input power feeder to detect a voltage and a dummy load circuit for allowing a dummy load to be connected to the input power feeder to control a micro current to flow to a ground side; and
   the power source control section monitors a voltage drop of the input power feeder when the micro current is controlled to flow as the power source energy, and closes the power supply switch to start the power supply to the load when the voltage drop becomes smaller so that the power source energy exceeds the first level.

4. The power source control device according to claim 1, wherein the power source comprises a vibration energy harvester.

5. The power source control device according to claim 2, wherein the power source comprises a vibration energy harvester.

6. The power source control device according to claim 3, wherein the power source comprises a vibration energy harvester.

7. The power source control device according to claim 1, wherein:
   the power source comprises a vibration energy harvester;
   the power-source energy detecting section comprises a power-generation state detection circuit connected to an output side of the vibration energy harvester to pulse a generated voltage through comparison with a predetermined reference voltage; and
   the power source control section monitors a count value obtained by counting pulses generated by the power-generation state detection circuit for a predetermined time period as the power source energy, and closes the power supply switch to start the power supply to the load when the count value exceeds the first level.

8. The power source control device according to claim 1, further comprising a circuit including a boosting DC-DC converter having a starting voltage lower than a starting voltage of the DC-DC converter and a boosting power storage element for accumulating power by the boosting DC-DC converter, the circuit being connected in parallel to the input power feeder on an output side of the power storage element to form a loop so that the charging voltage of the power storage element is boosted by a charging voltage of the boosting power storage element,
   wherein the power source control section stops an operation of the boosting DC-DC converter when the voltage of the input power feeder exceeds a fourth predetermined voltage that is larger than the third predetermined voltage.

9. The power source control device according to claim 2, further comprising a circuit including a boosting DC-DC converter having a starting voltage lower than a starting voltage of the DC-DC converter and a boosting power storage element for accumulating power by the boosting DC-DC converter, the circuit being connected in parallel to the input power feeder on an output side of the power storage element to form a loop so that the charging voltage of the power storage element is boosted by a charging voltage of the boosting power storage element,
   wherein the power source control section stops an operation of the boosting DC-DC converter when the voltage of the input power feeder exceeds a fourth predetermined voltage that is larger than the third predetermined voltage.

10. The power source control device according to claim 3, further comprising a circuit including a boosting DC-DC converter having a starting voltage lower than a starting voltage of the DC-DC converter and a boosting power storage element for accumulating power by the boosting DC-DC converter, the circuit being connected in parallel to the input power feeder on an output side of the power storage element to form a loop so that the charging voltage of the power storage element is boosted by a charging voltage of the boosting power storage element,
   wherein the power source control section stops an operation of the boosting DC-DC converter when the voltage of the input power feeder exceeds a fourth predetermined voltage that is larger than the third predetermined voltage.

11. The power source control device according to claim 4, further comprising a circuit including a boosting DC-DC converter having a starting voltage lower than a starting voltage of the DC-DC converter and a boosting power storage element for accumulating power by the boosting DC-DC converter, the circuit being connected in parallel to the input power feeder on an output side of the power storage element to form a loop so that the charging voltage of the power storage element is boosted by a charging voltage of the boosting power storage element, wherein the power source control section stops an operation of the boosting DC-DC converter when the voltage of the input power feeder exceeds a fourth predetermined voltage that is larger than the third predetermined voltage.

12. The power source control device according to claim 5, further comprising a circuit including a boosting DC-DC converter having a starting voltage lower than a starting voltage of the DC-DC converter and a boosting power storage element for accumulating power by the boosting DC-DC converter, the circuit being connected in parallel to the input power feeder on an output side of the power storage element to form a loop so that the charging voltage of the power storage element is boosted by a charging voltage of the boosting power storage element, wherein the power source control section stops an operation of the boosting DC-DC converter when the voltage of the input power feeder exceeds a fourth predetermined voltage that is larger than the third predetermined voltage.

13. The power source control device according to claim 6, further comprising a circuit including a boosting DC-DC converter having a starting voltage lower than a starting voltage of the DC-DC converter and a boosting power storage element for accumulating power by the boosting DC-DC converter, the circuit being connected in parallel to the input power feeder on an output side of the power storage element to form a loop so that the charging voltage of the power storage element is boosted by a charging voltage of the boosting power storage element, wherein the power source control section stops an operation of the boosting DC-DC converter when the voltage of the input power feeder exceeds a fourth predetermined voltage that is larger than the third predetermined voltage.

14. The power source control device according to claim 7, further comprising a circuit including a boosting DC-DC converter having a starting voltage lower than a starting voltage of the DC-DC converter and a boosting power storage element for accumulating power by the boosting DC-DC converter, the circuit being connected in parallel to the input power feeder on an output side of the power storage element to form a loop so that the charging voltage of the power storage element is boosted by a charging voltage of the boosting power storage element, wherein the power source control section stops an operation of the boosting DC-DC converter when the voltage of the input power feeder exceeds a fourth predetermined voltage that is larger than the third predetermined voltage.

15. A method for controlling a power source control device configured to accumulate power generated by a power source in a power storage element, the power source control device comprising: a DC-DC converter for converting power input through an input power feeder into a predetermined voltage to supply the predetermined voltage to a load connected to an output power feeder, the DC-DC converter being configured to be activated to start power feeding when a voltage of the input power feeder exceeds a first predetermined voltage, and stop operating when the voltage of the input power feeder becomes lower than a second predetermined voltage that is lower than the first predetermined voltage; and a power source control section including a microcomputer for controlling power supply to the load, the method comprising:

controlling the power source control section to operate by power feeding from the output power feeder side of the DC-DC converter, and to be activated at start of the power feeding, to operate thereafter in a low power-consumption operation mode in which only a power source energy of the power source is periodically monitored, and to start the power supply to the load when the power source energy exceeds a first level corresponding to a state in which the voltage of the input power feeder becomes equal to a third predetermined voltage higher than the first predetermined voltage.

\* \* \* \* \*